March 25, 1930.  G. RAIMONDI  1,752,200
LAND AND WATER VEHICLE
Filed April 12, 1929   5 Sheets-Sheet 1
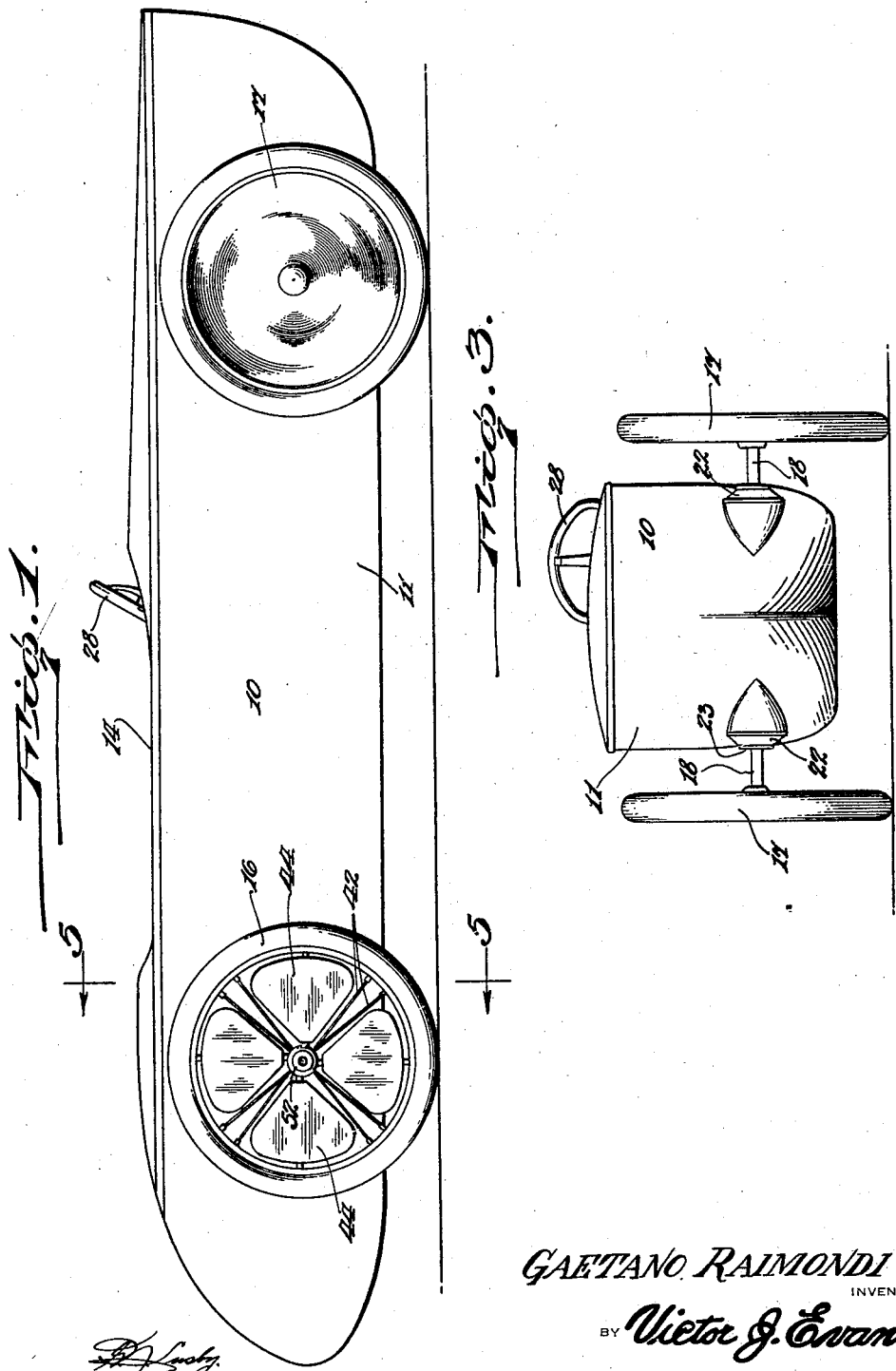
GAETANO RAIMONDI
INVENTOR

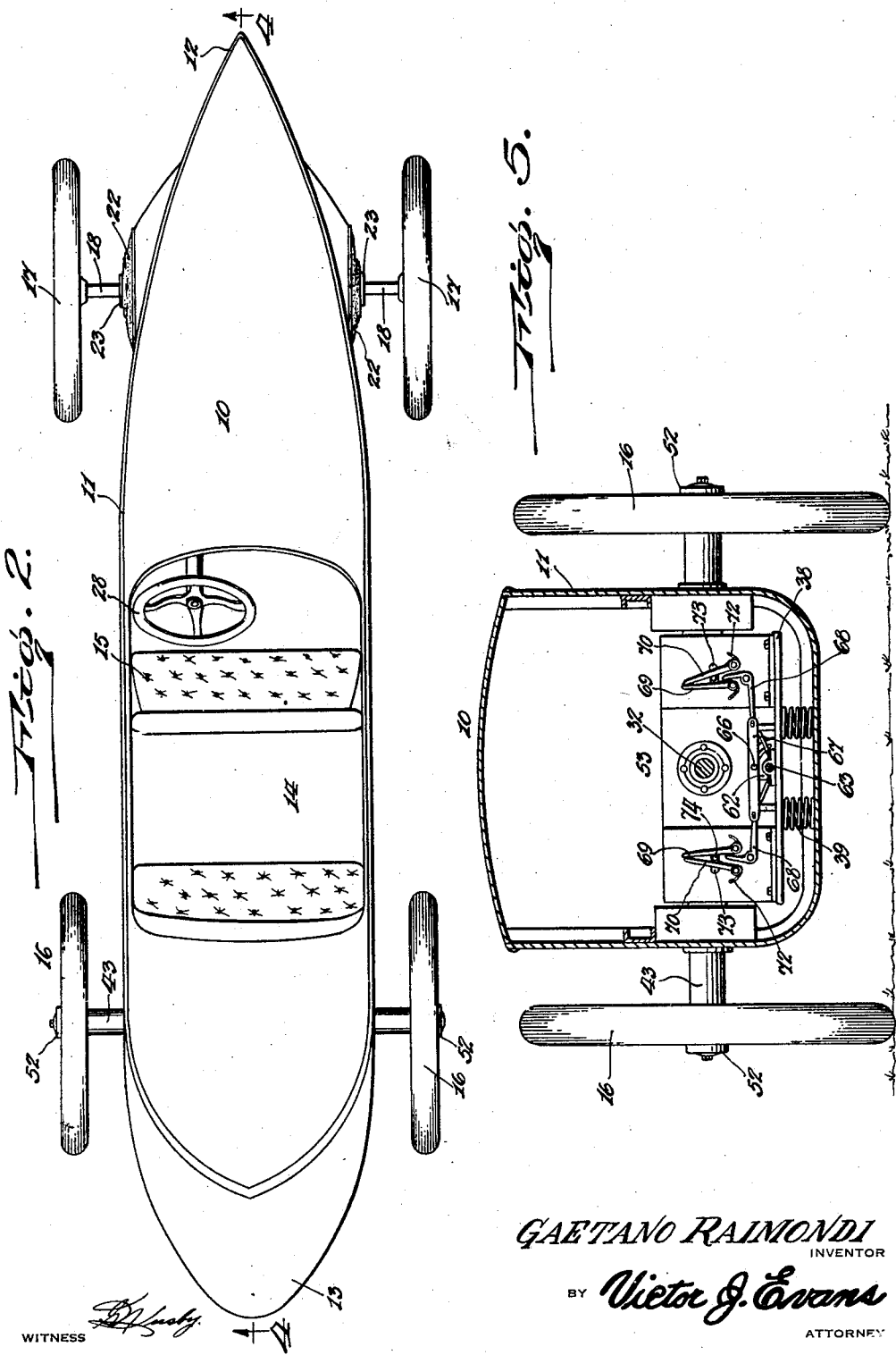

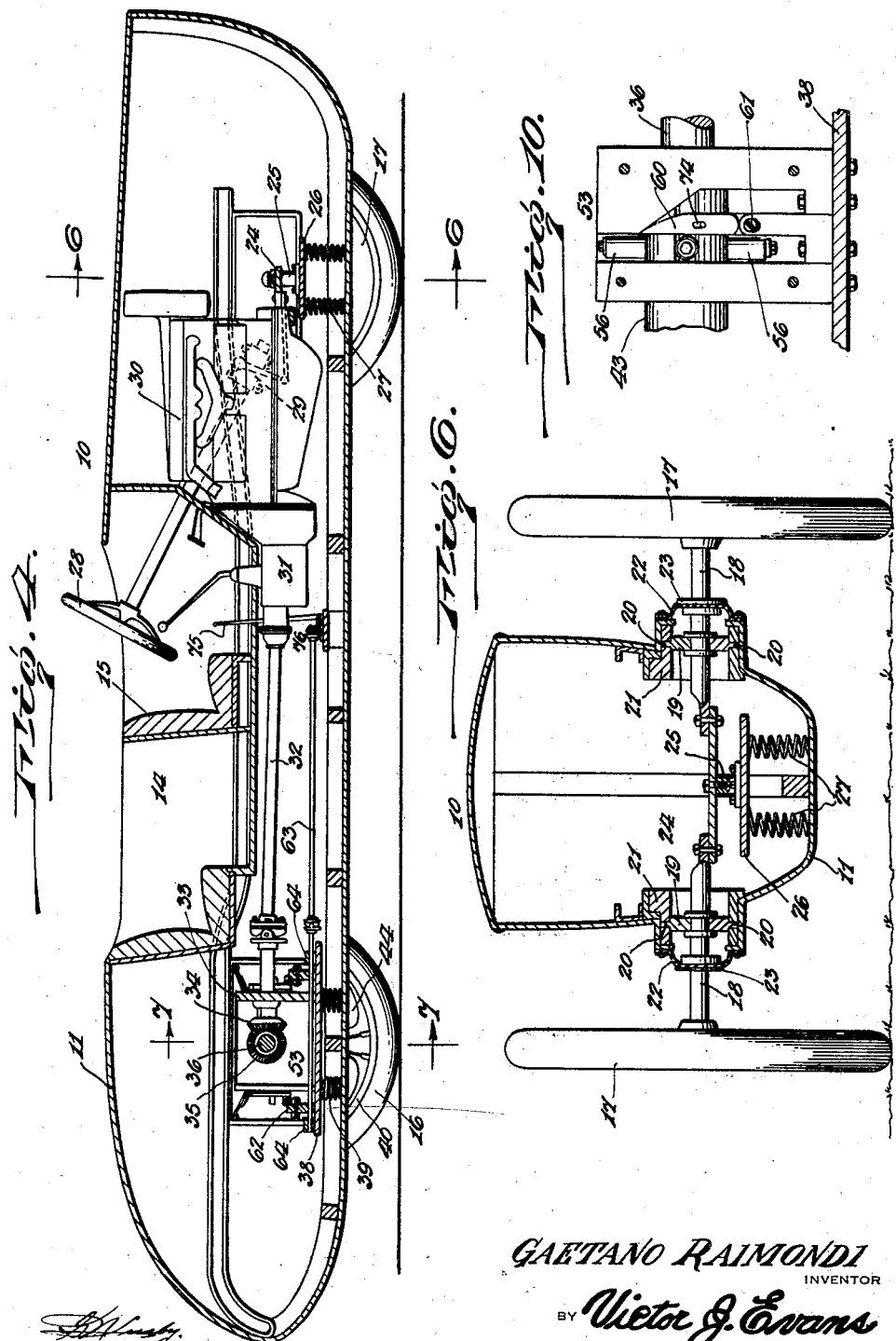

March 25, 1930.  G. RAIMONDI  1,752,200
LAND AND WATER VEHICLE
Filed April 12, 1929  5 Sheets-Sheet 4
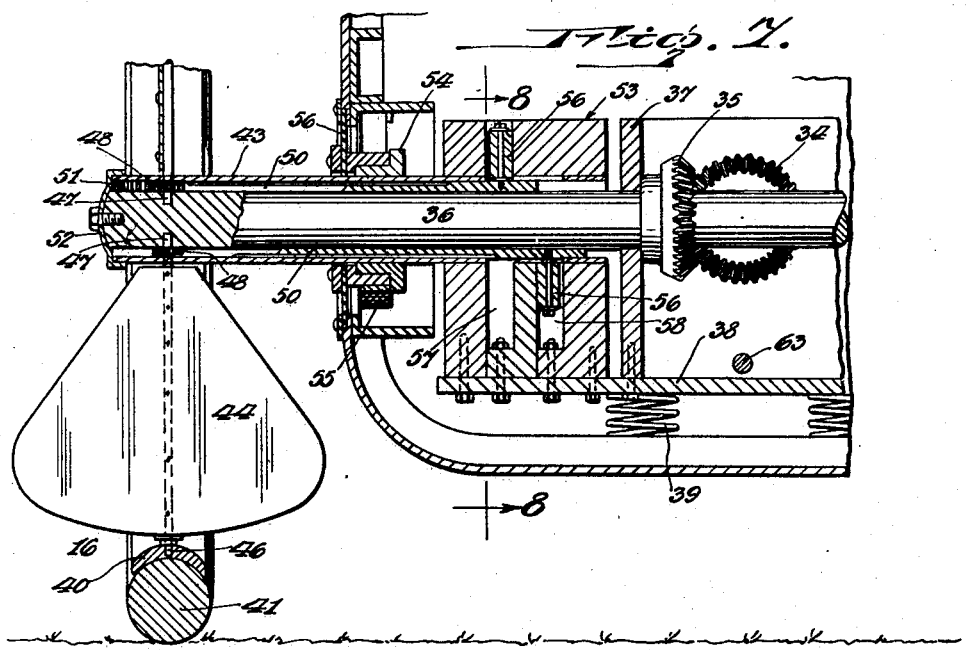
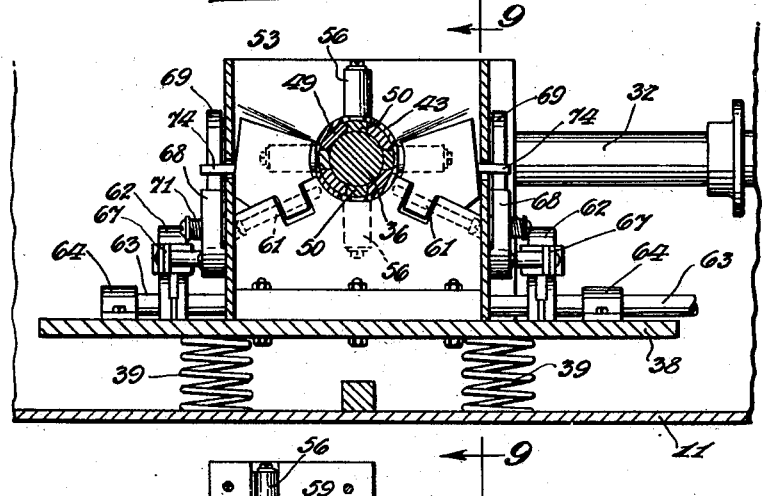
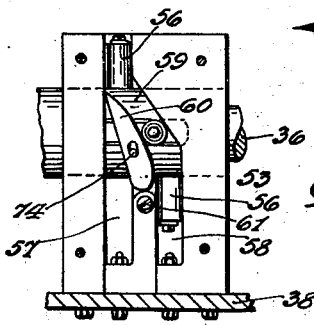
GAETANO RAIMONDI
INVENTOR
BY Victor J. Evans
ATTORNEY
WITNESS March 25, 1930.　　　G. RAIMONDI　　　1,752,200
LAND AND WATER VEHICLE
Filed April 12, 1929　　　5 Sheets-Sheet 5
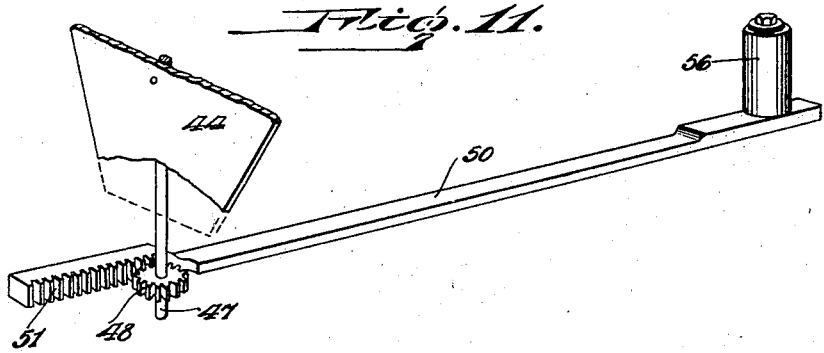
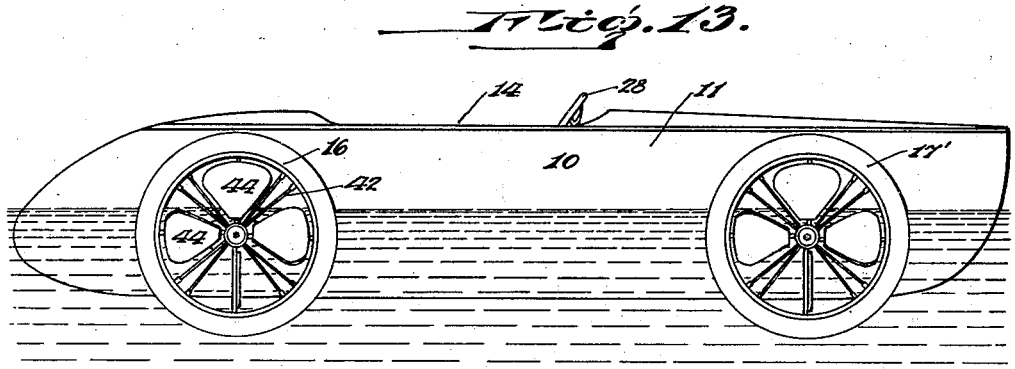
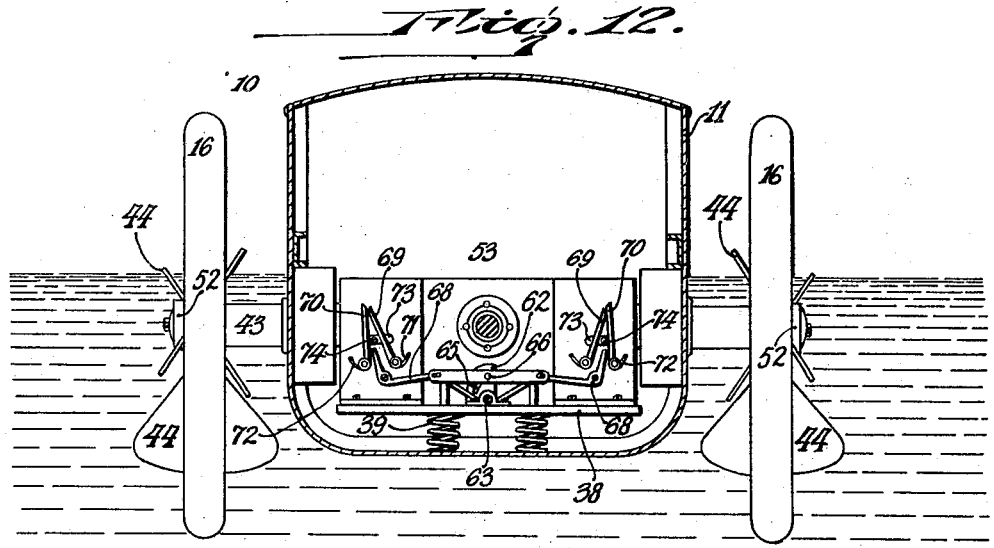
GAETANO RAIMONDI
INVENTOR Patented Mar. 25, 1930

1,752,200

UNITED STATES PATENT OFFICE

GAETANO RAIMONDI, OF NEW YORK, N. Y.

LAND AND WATER VEHICLE

Application filed April 12, 1929. Serial No. 354,553.

This invention relates to improvements in land and water vehicles.

The primary object of the invention resides in the provision of a motor vehicle which may be used for travel either upon land or water and is designed to resemble a boat when driven in the water and an automobile when travelling upon land.

Another object of the invention is to provide a vehicle with a buoyant watertight body having wheels for propelling the same upon land and the drive wheels of which are provided with paddles capable of being held in an operative position within the wheels when the vehicle is operating on land and which paddles may be released to act in propelling the vehicle upon a body of water whereby common driving means is employed for propelling the vehicle at all times.

Another object of the invention is the provision of a wheeled vehicle having propelling blades mounted in the wheels thereof and which blades automatically move from an operative or propelling position to an inoperative or feathering position after they have produced their propelling action in order to reduce resistance.

A still further object of the invention is to provide a combination vehicle in which the propelling means can be selectively controlled from the seat of the operator to transform the same from one type to the other.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevational view of my vehicle for travelling upon land.

Figure 2 is a top plan view of the same.

Figure 3 is a front elevational view.

Figure 4 is a vertical longitudinal sectional view on the line 4—4 of Figure 2.

Figure 5 is a vertical transverse sectional view on the line 5—5 of Figure 1.

Figure 6 is a vertical transverse sectional view on the line 6—6 of Figure 4.

Figure 7 is an enlarged detail vertical sectional view through one of the rear driving wheels taken on the line 7—7 of Figure 4 and showing the paddle locking means unlocked.

Figure 8 is a vertical transverse sectional view on the line 8—8 of Figure 7.

Figure 9 is a vertical sectional view on the line 9—9 of Figure 8.

Figure 10 is a view similar to Figure 9 but showing the position of the control gate when the water driving blades are in inoperative position.

Figure 11 is a detail perspective view of one of the blade actuating mechanisms.

Figure 12 is a view similar to Figure 5 but showing the water propelling blades in operative position.

Figure 13 is a side elevational view showing a vehicle of the four wheeled driving type.

Referring to the drawings by reference characters, the numeral 10 designates my improved combination vehicle which includes a hollow buoyant watertight body 11 which tapers to a point at its front as at 12 and is rounded at its rear as at 13 to impart thereto a general appearance of a boat. The body is provided with a passenger compartment 14 which may be of such size as to accommodate any given number of passengers, the forward seat in the compartment being the driver's seat designated at 15.

In the preferred embodiment, I provide rear driving wheels 16 and front steering wheels 17, the said front wheels being turnably mounted upon axles 18 which are turnably mounted for movement on a horizontal plane in disks 19 which are provided with diametrically opposed trunnions 20 journalled in box like bearings 21. These bearings are made watertight by applying flexible waterproof coverings 22 over the outer ends of the bearings and through which the axles pass, there being collars 23 on the axles between which the covers are securely fastened. The inner ends of the axles 18 are pivotally connected to the respective ends of a cross bar 24 turnably mounted for horizontal movement on a bearing 25 mounted upon a resilient platform 26 supported above the bottom of the body upon springs 27. These springs are adapted to take up any shock at the forward end of the vehicle. It will be seen that by applying a turning movement to the cross bar 24, the wheels 17 may be turned simultaneously in the same direction to facilitate steering of the vehicle both upon land and water as the said front wheels are of the disk type and when in water will act as a rudder. For imparting turning movements to the cross bar 24, I provide a steering wheel 28 within reach of the driver sitting upon the seat 15 and which wheel is operatively connected to the cross bar by any conventional form of mechanism such as used at present upon motor vehicles and which is designated by the numeral 29.

Having described the steering mechanism, I shall now proceed to explain the driving means which includes a motor 30 mounted at the forward end of the body and which may be of the internal combustion type. Correlated with the motor is the usual speed transmission 31 of any particular type by which various forward speeds and reverse speed may be transmitted from the motor 30 to the drive shaft 32 which leads back to the rear end of the body, and which shaft is mounted in a bearing 33. The drive shaft 32 carries a ring gear 34 which constantly meshes with a pinion gear 35 fixed to the rear axles 36 on which the rear wheels 16 are fixedly mounted. The rear axles 36 are journalled in bearings 37 supported upon a rear platform 38 yieldingly supported in spaced relation to the bottom of the body by springs 39.

Each one of the rear driving wheels 16 is of a novel construction which includes an annular felly or rim 40 which carries a solid rubber tire 41 while wire spokes 42 extend from the felly inward to a housing or hub 43 which telescopes the end of the axle 36 on which the wheel is mounted. Turnably mounted between the spokes 42 are propelling blades or wings 44 having outer trunnions 46 journalled in the felly and inner trunnions 47 extending through openings in the housing 43 and journalled in the axle 36. Each inner trunnion 47 carries a gear 48 disposed in a space between the axle and the housing 43 and which housing and axle are held spaced by a sleeve 49 interposed therebetween, and which sleeve is slotted to accommodate slide bars 50 which bars carry a gear rack 51 at their outer ends for constant meshing engagement with the gears 48 of the respective blades. The blades 44 are of sufficient width at their outer ends as to extend beyond opposite sides of the wheel when moved to an operative propelling position and their sides taper inwardly toward the axis of the wheel as clearly shown in Figures 1, 7 and 12 of the drawings. When the blades are disposed in an inoperative position, the same are disposed within the plane of the wheel so as not to act as a resistance when the vehicle is used upon land but these blades are capable of being automatically moved to an operative position for propelling the vehicle when driven in the water as a boat. Means for controlling the actuations of the blades will be presently explained.

Covering the outer ends of the axles 36 and housings 43 are hub caps 52 which may be made watertight to exclude the entrance of water within the housing. The housing 43 extends inwardly of the body and is journalled in a bearing 53 mounted upon the resilient platform 38 and is also mounted in a resilient bearing 54 suspended upon springs 55 mounted to the chassis frame of the body. These resilient rear bearings 54 are made watertight by flexible rubber coverings 56 secured to the body and through which the axles and their housings extend. In the drawing, I have shown four propelling blades to each rear driving wheel and which are operable by their respective actuating slide bars 50, the inner end of each bar carrying a roller 56, the rollers of each may be made to travel either in a continuous circular slot 57 or in an irregular cam slot 58, there being by-passes 59 between the two slots which are controlled by gates 60 pivoted to the bearing 53 as at 61. It will be noted that when the gates 60 are moved to a vertical position as shown in Figure 10, the rollers will travel in the circular slot 57, thus no lateral movements are imparted to the sliding actuating bars 50, thus the plates 44 remain within the plane of the rear wheels. However, should the gates 60 be moved to an angular position shown in Figure 9 to lie within the slots 50 in the path of the rollers, the said rollers will be guided into the irregular cam slots 58, thus reciprocating movement is imparted to the sliding bars 50 to alternately turn the blades to operative and inoperative positions. The cam slots are so designed that the lower half is out of the vertical plane of the upper half which causes the blades to open up just prior to their entrance into the water on each revolution of the wheel and which return to an operative or feathering position after they have passed the vertical center of the axle. It will therefore be appreciated that the plates automatically open up as they enter the water and close after they have completed their propelling action so that they are in feathering position during their idle interval when out of the water to reduce resistance.

For the purpose of controlling the actuations of the gates 60, I provide suitable means operable from the driver's seat of the vehicle and which includes cams 62 which are mounted on opposite sides of the bearing 53 and which cams are fixedly mounted on a shaft 63 extending lengthwise of the body and which is journalled in bearings 64 mounted on the platform 38. These cams are provided with arcuate shaped slots 65 into which pins 66 extend, which pins are carried by cross links 67 which have their outer ends pivotally connected to one of the arms of bell crank levers 68 pivotally mounted on opposite sides of the bearing block. The other arms of the bell cranks extend between sets of arms 69 and 70 pivoted to the sides of the bearing blocks and which arms are normally urged into contact with each other by springs 71 and 72 respectively. Extending through slots 73 in the bearing block intermediate the arms 69 and 70 of each set are pins 74 projecting from the respective gates 60. The forward end of the actuating shaft 63 is operatively connected to a shifting lever 75 within reach of the operator by suitable operating means 76 and by moving the lever 75 in one direction, the shaft 63 is turned to move the cams 62 to an upright position as shown in Figure 5 whereupon the spring actuating arms 69 hold the pins 74 at the outer ends of the slots 73 which holds the gates 60 in the position shown in Figure 10 of the drawings. By actuating the lever 75 in an opposite direction, the shaft 63 is turned which upsets the cams 62 as shown in Figure 12 which causes the bell cranks 68 to actuate the arms 69 inwardly thus allowing the spring actuated arms 70 to push the pins 74 inwardly to swing the gates to the position shown in Figure 9 at which time the by-passes 59 are closed causing the rollers 56 to travel in the irregular cam slots 58. It will therefore be seen that the propelling blades may be manually controlled for movement to either operative or inoperative positions depending upon whether the vehicle is to be driven on either land or water.

In Figure 13 of the drawings, I have shown a slightly modified form wherein a vehicle is provided with a four wheel drive. In this form, the front steering wheels 17' are constructed in a manner similar to the drive wheels 16 shown in the preferred form and therefore a detailed explanation as to the construction and operation of the same is not believed necessary. To operate the four wheel drive, it will be necessary to operatively connect the front wheels with the power shaft from the motor but the transmission of the power may be produced in a manner similar to that already described which might be a duplication of the rear drive.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A combination land and water vehicle comprising a buoyant body, steering wheels at the front of said body, driving wheels at the rear of said body, blades pivotally mounted in said driving wheels for movement to an inoperative position within the plane of said wheels and to an operative position to extend beyond the opposite sides of said wheels, and manually operated means for controlling the movement of said blades to inoperative and operative positions, and automatic means for feathering said blades during an interval in the revolution of said wheels when the blades are in operative position.

2. A combination land and water vehicle comprising a buoyant body, steering wheels at the front of said body, driving wheels at the rear of said body, blades pivotally mounted in said driving wheels for movement to an inoperative position within the plane of said wheels and to an operative position to extend beyond the opposite sides of said wheels, and manually operated means for controlling the movement of said blades to inoperative and operative positions, and automatic means for feathering said blades during an interval in the revolution of said wheels when the blades are in operative position, said automatic means including gears on the pivots of said blades, slidable actuating bars provided with gear racks for meshing engagement with the respective gears, rollers carried by said bars, and cam slots within which said rollers ride for imparting sliding movement to said actuating bars.

3. A combination land and water vehicle comprising a buoyant body, steering wheels at the front of said body, a rear axle journalled at the rear of said body, driving means for said rear axle, wheels fixed to said axle, propelling blades turnably mounted in said wheels for movement to lie within the plane of said wheels in idling position, and for movement to an operative position at right angle to said idling position, means selectively controlled for locking said blades in idling position during continuous rotation of said wheels, or for alternately moving the same to operative position and idling position upon each revolution of said wheels.

4. A combination land and water vehicle comprising a buoyant body, steering wheels at the front of said body, a rear axle journalled at the rear of said body, driving means for said rear axle, wheels fixed to said axle, propelling blades turnably mounted in said wheels for movement to lie within the plane of said wheels in idling position, and for movement to an operative position at right angle to said idling position, means selectively controlled for locking the blades in idling position during continuous rotation of said wheels, or for alternately moving the same to operative position and idling position upon each revolution of said wheels, said means including rack bars slidable lengthwise of said axle, gears on said blades meshing with said rack bars, rollers on said rack bars, continuous annular slots and irregular cam slots for the reception of said rollers with by-passes therebetween, and gates at said by-passes for switching said rollers into either the annular slot or said irregular cam slots.

5. A combination land and water vehicle comprising a buoyant body, steering wheels at the front of said body, a rear axle journalled at the rear of said body, driving means for said rear axle, wheels fixed to said axle, propelling blades turnably mounted in said wheels for movement to lie within the plane of said wheels in idling position, and for movement to an operative position at right angle to said idling position, means selectively controlled for locking said blades in idling position during continuous rotation of said wheels, or for alternately moving the same to operative position and idling position upon each revolution of said wheels, said means including rack bars slidable lengthwise of said axle, gears on said blades meshing with said rack bars, rollers on said rack bars, continuous annular slots and irregular cam slots for the reception of said rollers with by-passes therebetween, and gates at said by-passes for switching said rollers into either the annular slot or said irregular cam slots, and means for remotely controlling the actuation of said gates.

6. In combination with the driven axle of a vehicle, a wheel mounted thereon, propelling blades pivotally mounted within said wheels for movement to an idling position within the plane of said wheel and to an operative position at right angle thereto, and means for successively moving said blades to idling and operative positions during each revolution of said axle.

7. In combination with the driven axle of a vehicle, a wheel mounted thereon, propelling blades pivotally mounted within said wheel for movement to an idling position within the plane of said wheel and to an operative position at right angle thereto, and selective means for successively moving said blades to idling and operative positions during each revolution of said axle or for causing said blades to remain in idling position during continuous rotation of said axle.

8. In a combined land and water vehicle, a buoyant body, land and water propelling means therefor, aligned axles journalled in bearings in said body for horizontal turning movement, flexible waterproof covers closing the outersides of the bearings and through which said axles extend, disk wheels carried by the outer ends of said axles, and steering mechanism operatively connected with said axles for turning the same simultaneously in the same direction.

9. A combined land and water vehicle comprising a buoyant watertight body having a passenger carrying compartment therein, driving wheels at the rear of said body, propelling blades pivotally mounted in said driving wheels, manually operable means controlled from the driver's seat in said compartment for locking said blades in inoperative or idling position and for releasing the same to swing to operative position, means for automatically causing said blades to swing to operative position upon rotation of said driving wheels, front steering wheels of the disk type and steering mechanism operable from the driver's seat in said compartment for operating said steering wheels.

In testimony whereof I have affixed my signature.

GAETANO RAIMONDI.